Figure 1:
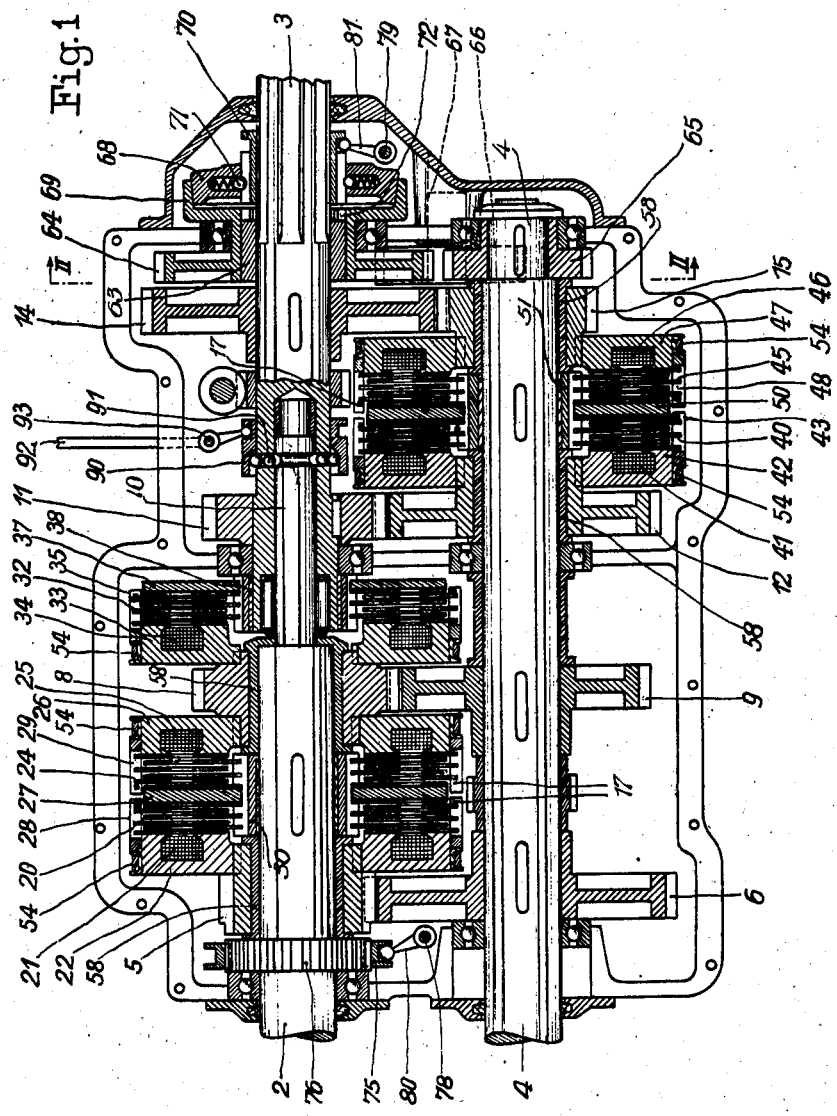

Jan. 6, 1942.  A. MAIER  2,269,215

VEHICLE CHANGE-SPEED GEAR

Filed April 29, 1939  2 Sheets-Sheet 1

Inventor:
Albert Maier
by S. Sokal,
Attorney.

Jan. 6, 1942.   A. MAIER   2,269,215
VEHICLE CHANGE-SPEED GEAR
Filed April 29, 1939   2 Sheets-Sheet 2

Inventor:
Albert Maier
by S. Sokal,
Attorney.

Patented Jan. 6, 1942

2,269,215

UNITED STATES PATENT OFFICE 2,269,215

VEHICLE CHANGE-SPEED GEAR

Albert Maier, Friedrichshafen, Bodensee, Germany, assignor to Zahnradfabrik Friedrichshafen Aktiengesellschaft, Friedrichshafen-on-the-Bodensee, Germany Application April 29, 1939, Serial No. 270,785
In Germany May 19, 1938

9 Claims. (Cl. 74—359)

This invention relates to improvements in a power vehicle gear provided with electromagnetic control clutches for obtaining six forward speeds, and more particularly to a gear in which four pairs of constantly meshing pinions are arranged on two coaxial main shafts and a counter shaft arranged parallel thereto, the two pairs of pinions located on the engine side of the gear being used alternately as the so-called constant transmission for obtaining certain speed stages.

In contradistinction to the already known six-speed gears having two pairs of pinions located on the engine side which serve alternately for the constant transmission, the invention provides a novel arrangement or grouping of the pinions for the various speed stages such that particularly favourable transmission ratios and simplified control are effected, not only for obtaining a high speed or overdrive provided in the gear, but also for obtaining the remaining speed stages and the reverse speed and, moreover, the total dimensions of the gear are considerably limited or reduced particularly by the utmost reduction of the axial distance between the main gear shafts and the counter shaft.

Of the two pairs of pinions arranged on the engine side which are employed alternately as the so-called constant transmission to the intermediate shaft, the main shaft pinions are, in accordance with the invention, arranged free but individually couplable on the driving shaft and, of the next adjacent pairs of pinions, the pinions arranged on the countershaft lie loose on this shaft and are individually couplable with it and the pinions are so arranged in the gear with regard to their dimensions, that, for attaining the high speed or overdrive, the second pair of pinions, provided for the constant transmission from the driving shaft to the countershaft, is used and the torque is transmitted through the third pair of pinions to the driven shaft and, with the gear set in third speed, the driving pinion of the high speed or overdrive is used as the driving pinion and, with the gear in fourth speed, the driven pinion of the high speed or overdrive ratio is used as the driven pinion of this speed.

Compared with the hitherto usual constructions of gears in which, for obtaining the high speed or overdrive, the driven pinion on the driven shaft is always the smallest pinion and for first, that is to say, the slowest speed, the smallest pinion on the countershaft is always used, the grouping of the pinions in accordance with this invention is particularly advantageous insofar as, for the high speed or overdrive, large pinions with a considerable number of teeth are employed without any increase in size of the gear, that is to say, of the axial distance between the coaxial main shafts and the countershaft being necessary in spite of the larger driven pinion being used for the high speed or overdrive. The large pinions with a considerable number of teeth are characterised by greater overlapping in engagement and by increased quietness of running. There is, moreover, the advantage that, without limiting the dimensions of the diameter of the control clutch, desirable for the correct torque transmission, the axial distance between the gear shafts can be kept as small as possible. The arrangement of the control clutches, in accordance with the invention, on the driving shaft and the intermediate shaft, as well as between the driving and driven shafts, results in a favourable ratio of the relative speed in the clutches during the use of the individual speed stages and thus security against dangerous over-heating. Moreover, a favourable quiet running is attained, insofar as the pinions transmit chiefly at a reduced or geared down speed and only seldom at an accelerated or geared up speed. The tooth engagements are preferably balanced in the individual gear speeds.

The reverse speed can be switched in in a simple manner purely mechanically without the use of the electromagnetic clutches, there being provided on the inlet side of the gear a displaceable control clutch member for coupling the first pinion of the driving shaft with the latter shaft and on the exit side of the gear a clutch part for coupling the reverse pinion set with the driven shaft and both clutch parts are connected with one another by a linkage in such a manner that they can be positively actuated simultaneously.

Moreover, a separate, purely mechanical clutch device is arranged between the main shafts for enabling the engine to be started by the actual movement of the vehicle.

Figure 2:
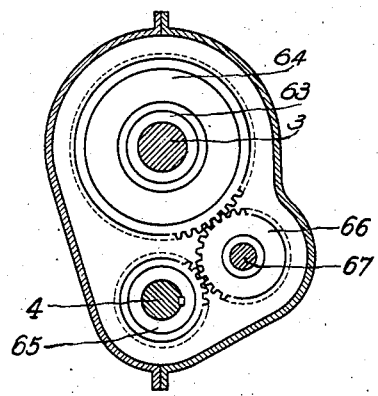
Figure 3:
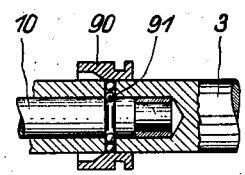
Figure 4:
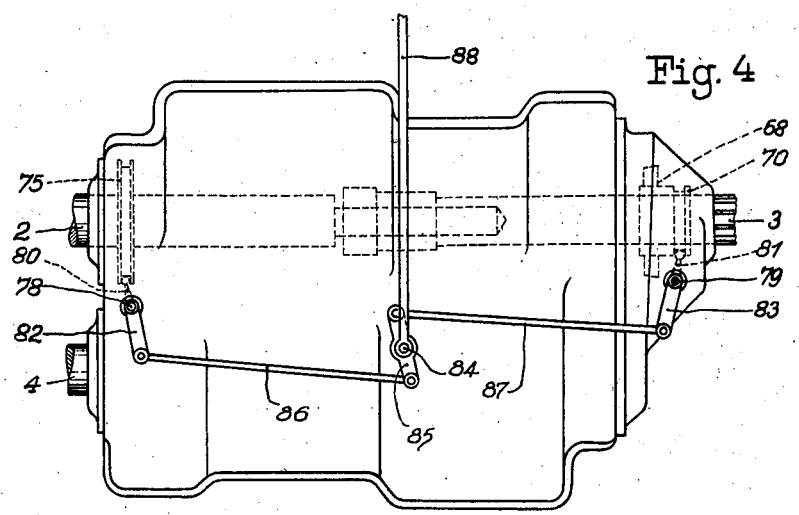

In order that the invention may be fully understood, I shall now describe one embodiment thereof by way of example by reference to the accompanying drawing, in which:

Fig. 1 is a vertical longitudinal section of a six-speed gear embodying the invention and shown in the neutral or idle run position, Fig. 2 is a vertical section on the line II—II of Fig. 1, Fig. 3 is a sectional view of a detail, and Fig. 4 is an elevation of the gear to a smaller scale than Fig. 1.

The two coaxial main shafts are indicated by 2 and 3, 2 being the driving shaft and 3 the driven shaft. The driven shaft 3 is made hollow over a portion thereof and receives in this hollow portion an extension 10 of the driving shaft 2. 4 is the countershaft. The pairs of pinions provided for obtaining the different speed stages are arranged in a definite manner on the main and countershafts. Of the first pair of pinions 5 and 6, the pinion 5 is arranged loose on the driving shaft 2 whilst the pinion 6 is keyed on the countershaft 4. In the same manner, of the two pairs of pinions 8 and 9, the pinion 8 is arranged loose on the shaft 2 and the pinion 9 is keyed on the countershaft 4. These loose pinions 5 and 8 on the driving shaft can be coupled to this shaft. The pinion 8 of the second pair of pinions is, moreover, adapted to be coupled to the driven shaft 3, into which the extension 10 of the shaft 2 projects. The disc or plate clutch 20 is provided for the pinion 5.

The magnet body 22, carrying the magnet coil 21, is keyed on the hub of the pinion 5. For the pinion 8 there is provided the disc or plate clutch 24 of which the magnet body 26, carrying the magnet coil 25, is keyed on the hub of the said pinion 8. An intermediate disc 27 is located between the two disc clutches 20 and 24. In order to enable each clutch to act by itself, that is to say, without influencing the adjacent clutch, the outer discs, located adjacent the disc 27, are bounded by spring rings 17 or other stops. The same separation of the clutches from one another is also attained if, instead of the disc 27, two discs are used between which is inserted a layer of non-magnetic material. Separate claw members 28, 29 are arranged on the magnet bodies 22, 26 at the circumference thereof, which serve for carrying or guiding the outer plates or discs. The inner plates or discs are guided by a claw ring 30 keyed on the driving shaft 2, which ring 30 is arranged on a non-magnetic intermediate bushing.

The pinion 8 of the second pair of pinions is, moreover, provided with a disc or plate clutch 32, the member 34, carrying the magnet coil 33, being keyed on the hub of the pinion 8 and the outer plates or discs of the clutch are guided by claw members 35 arranged on the periphery of the magnet body 34. The inner discs or plates and also a locking disc 37 are carried on a claw ring 38 which is arranged on the driven shaft 3 with the interposition of a non-magnetic bushing. The pinions 11 and 14 are keyed on the shaft 3. The pinion 11 forms, with the pinion 12, loosely mounted on the countershaft 4, the third pair of pinions and the pinion 14 forms with the pinion 15, loosely mounted on the countershaft 4, the fourth pair of pinions. Between the pinions 12 and 15 are located two disc or plate clutches 40 and 45, one of which serves for coupling the pinion 15 with the countershaft 4. The disc or plate clutch 40 of the pinion 12 is provided with a magnet coil 41, the magnet body 42 of which is keyed on the hub of the pinion 12. The magnet body 42 is provided externally with claw members 43 on which the outer discs or plates are guided. The disc or plate clutch 45 pertains to the pinion 15 and accordingly the magnet body 47, carrying the manget coil 46, is keyed on the hub of the said pinion. Claw members 48, which are secured to the cover of the magnet body 47, serve for guiding the outer plates or discs. A clutch disc 50 is located between the two clutches 40 and 45. This clutch disc and the inner discs or plates are guided on a claw ring 51 fixed on the shaft 4. The pinions 12 and 15 can, according to requirements, be individually clutched to the countershaft 4. Groove rims of non-conducting material, in which special slip rings 54 for conducting the necessary current are embedded, are provided for the various electromagnetic disc or plate clutches. With reference to the use of the electromagnetic clutches, the couplable pinions must be separated from their shafts. For this purpose, suitable bushes 58 of non-magnetic material are used as bearings in the individual pinions.

For the purpose of obtaining the reverse drive of the vehicle, a pinion 64 is freely rotatably arranged on a bushing 63 of the shaft 3 and on the countershaft 4 is fixed a pinion 65. In engagement with these two pinions is a pinion 66 freely rotatable on a shaft 67. The pinions 64 can be coupled to the shaft 3 by means of a clutch member 68 which represents a friction member which, for its part, fits into a clutch ring 69 combined with the pinion 64. The friction member 68 is arranged with grooves and projections on a control sleeve 70, which is longitudinally displaceably guided by means of grooves and projections on the shaft 3. Notches are formed in the sleeve 70 for receiving locking members 71 which are carried in the friction member 68 and are actuated by springs. The clutch device acts in such a manner that, on the bringing into operation of the sleeve 70, that is to say, on its displacement towards the left, the friction member 68 first comes into frictional engagement with the clutch ring 69 but directly before this causes the pinion 64 to be taken along with it and causes it to rotate at a speed equal to the speed of the shaft 3. Then, for the final clutching of the pinion 64 with the shaft 3 on a further displacement of the sleeve 70 to the left, its outer tooth portion comes into engagement with the inner tooth portion 72 of the pinion 64. Immediately before this, the locking members 71 are pressed back against the action of their springs so that, on the final clutching of the pinion 64 with the shaft 3, the friction closure between the parts 68 and 69 is removed. The arrangement is such that the reverse drive of the vehicle is effected at a definite speed through the use of the first pair of pinions 5 and 6. To this end, a device is provided which enables the pinion 5 to be clutched to the shaft 2 without the use of the disc or plate clutch 20. The pinion 5 forms on one side thereof by means of a stepped portion, a clutch ring with which a clutch ring 75 can be brought into engagement. This ring 75 is displaceably arranged on a similarly toothed fixed collar 76 on the shaft 2. If the ring 75 is displaced laterally of the pinion 5, that is to say, towards the right, then the said pinion 5 will be clutched to the shaft 2. For controlling the clutch ring 75 and the sleeve 70, a suitable linkage is provided consisting of swingable control arms 80 and 81 and levers 82 and 83 with axes 78 and 79, and a central double lever 85 swingable around a pin 84 and rods 86 and 87. A lever 88 is connected to the lever 85. The linkage is so constructed that, on the swinging of the lever 88 in the one or the other direction, the two clutch parts, namely, the control sleeve 70 and the clutch ring 75, are simultaneously engaged or disengaged.

Between the driving shaft 2 and the driven shaft 3 is provided a separate clutch device which enables these shafts to be directly connected together for the purpose of effecting, by the freewheeling action of the vehicle, the starting of the engine through the medium of the gear should the electric current fail. It is, however, also possible, by means of this clutch device, to drive the vehicle in direct drive without the use of the electromagnetic clutches. The clutch device consists of a control sleeve 90 and a number of locking balls 91 or the like which can be moved into recesses formed in the extension 10 of the shaft 2, which projects into the shaft 3. In the uncoupled or disengaged position, as shown in Fig. 1, the balls 91 are not in contact with the extension 10 of the shaft 2 so that the shafts 2 and 3 are not coupled together. If the sleeve 90 is, however, displaced to a slight extent, as shown in Fig. 3, then the balls 91 are forced into the recesses in the extension 10 whereby the two shafts 2 and 3 will be connected together. A lever 92, which is swingable around a pin 93, is provided for actuating the sleeve 90.

The various speed stages are engaged in the following manner:

First speed is produced by exciting the coil 21 and the coil 46 so that the transmission is effected from the shaft 2 through the pinions 5, 6, the countershaft 4 and the pinions 15 and 14 to the driven shaft 3.

For obtaining the second speed, the coil 26 and the coil 46 are excited. Consequently, in this case, the transmission is effected from the driving shaft 2 through the pinions 8 and 9, the countershaft 4 and the pinions 15 and 14 to the driven shaft 3.

If it is desired to obtain third speed, then the coils 21 and 33 are excited. The drive is then effected from the shaft 2 through the pinions 5 and 6, the countershaft 4 and the pinions 9 and 8 to the driven shaft 3.

Fourth speed is attained by exciting the coils 21 and 41, the drive then being transmitted from the driving shaft 2 through the pinions 5 and 6, the countershaft 4 and the pinions 12 and 11 to the driven shaft 3.

If fifth speed is to be used, the coils 33 and 25 are excited, whereby the shafts 2 and 3 are directly coupled together. This produces direct drive.

The sixth speed, that is to say, the high speed or overdrive, is attained by exciting the coils 25 and 41. The drive is, in this case, effected from the driving shaft 2 through the pinions 8 and 9, the countershaft 4 and the pinions 12 and 11 to the shaft 3.

Reverse speed is attained by engaging the clutch members 75 and 70. The transmission thus comes from the shaft 2 through the pinions 5 and 6, the countershaft 4 and through the pinions 65, 66 and 67 to the driven shaft 3.

I claim:

1. A vehicle change-speed gear comprising a driving shaft, a driven shaft coaxial with said driving shaft, a countershaft arranged parallel to said coaxial shafts, a main pinion train comprising a small pinion loosely mounted on the driving shaft, a second pinion of intermediate size loosely mounted for rotation independently of the drive shaft and driven shaft and capable of being coupled selectively to the drive shaft and the driven shaft, a third pinion of intermediate size but smaller than the second pinion keyed to the driven shaft, and a fourth pinion, of larger size than any of said first, second and third pinions, also keyed to the driven shaft, pinions constantly meshing with the first two pinions of the main train keyed to the countershaft, a pinion in constant mesh with the third pinion of the main train loosely mounted on the countershaft, and a further pinion in constant mesh with the fourth pinion of the main train also loosely mounted on the countershaft, means for coupling the first pinion of the main train to the drive shaft, means for selectively coupling the second pinion of the main train to the drive shaft and to the driven shaft, and means for coupling each of the loosely mounted pinions on the countershaft to the countershaft.

2. A vehicle change-speed gear of the kind referred to comprising the subcombination of: a casing; a driving shaft rotatably mounted in said casing; a driven shaft rotatably mounted in said casing arranged coaxial with said driving shaft; a countershaft rotatably mounted in said casing, said shaft being arranged parallel to said coaxial driving and driven shafts; a first pinion loosely mounted on said driving shaft; a pinion keyed on said countershaft and meshing with said first-mentioned pinion, said pinions together forming a constant transmission from said driving- to said countershaft; a second pinion loosely mounted on said driving shaft adjacent to said first-mentioned pinion; a second pinion keyed on said countershaft and meshing with said second loosely mounted pinion, said second pair of pinions also forming a constant transmission from said driving- to said countershaft; means for coupling each of said loosely mounted pinions, on said driving shaft, to said shaft; independent means for coupling said second-mentioned loosely mounted pinion on said driving shaft to said driven shaft; a pinion keyed on said driven shaft adjacent said second constant transmission pair of pinions; a pinion meshing with said driven shaft pinion, loosely mounted on said countershaft; a further pinion keyed on said driven shaft adjacent said other pinion on said shaft; a pinion constantly meshing with said further keyed pinion, loosely mounted on said countershaft; and means for coupling each of said loosely mounted pinions, on said countershaft, to said shaft, and said pairs of constantly meshing pinions being so relatively located in said casing and so dimensioned that, for obtaining high speed or overdrive, said second-mentioned pair of constant transmission pinions and said third mentioned pair of pinions are employed, whilst, for obtaining the third speed ratio, said second-mentioned pinion on said driving shaft is coupled to said driven shaft to form the driven pinion for this speed and for obtaining the fourth speed ratio, said first-mentioned pinion of said driven shaft is employed as the driven pinion.

3. A vehicle change-speed gear of the kind referred to, comprising the subcombination of: a casing; a driving shaft rotatably mounted in said casing; a driven shaft rotatably mounted in said casing arranged coaxial with said driving shaft; a countershaft rotatably mounted in said casing, said shaft being arranged parallel to said coaxial driving and driven shafts; a first pinion loosely mounted on said driving shaft; a pinion keyed on said countershaft and meshing with said first-mentioned pinion, said pinions together forming a constant transmission from said driving- to said countershaft; a second pinion loosely mounted on said driving shaft adjacent to said first-mentioned pinion; a second pinion keyed on said countershaft and meshing with said second loosely mounted pinion, said second pair of pinions also forming a constant transmission from said driving- to said countershaft; an electromagnetic clutch associated with each of said loosely mounted pinions, said clutches being keyed on said driving shaft, operable to couple said pinions to said driving shaft; an independent electromagnetic clutch keyed on said driven shaft for coupling said second-mentioned loosely mounted pinion to said driven shaft; a pinion keyed on said driven shaft adjacent said second constant transmission pair of pinions; a pinion meshing with said driven-shaft pinion loosely mounted on said countershaft; a further pinion keyed on said driven shaft adjacent said other pinion on said shaft; a pinion constantly meshing with said further keyed pinion, loosely mounted on said countershaft; an electromagnetic clutch associated with each of said loosely mounted pinions on said countershaft, for coupling said pinions to said shaft and said pairs of constantly meshing pinions being so relatively located in said casing and so dimensioned that, for obtaining high speed or overdrive, said second-mentioned pair of constant transmission pinions and said third-mentioned pair of pinions are employed, whilst, for obtaining the third speed ratio, said second-mentioned pinion on said driving shaft is coupled to said driven shaft to form the driven pinion for this speed and for obtaining the fourth speed ratio, said first-mentioned pinion of said driven shaft is employed as the driven pinion.

4. A vehicle change-speed gear of the kind referred to, comprising the subcombination of: a casing; a driving shaft rotatably mounted in said casing; a driven shaft rotatably mounted in said casing arranged coaxial with said driving shaft; a countershaft rotatably mounted in said casing, said shaft being arranged parallel to said coaxial driving and driven shafts; a first pinion loosely mounted on said driving shaft; a pinion keyed on said countershaft and meshing with said first-mentioned pinion, said pinions together forming a constant transmission from said driving- to said countershaft; a second pinion loosely mounted on said driving shaft adjacent to said first-mentioned pinion; a second pinion keyed on said counter-shaft and meshing with said second loosely mounted pinion, said second pair of pinions also forming a constant transmission from said driving- to said countershaft; an electromagnetic clutch associated with each of said loosely mounted pinions, said clutches being keyed on said driving shaft, operable to couple said pinions to said driving shaft; an independent electromagnetic clutch keyed on said driven shaft for coupling said second-mentioned loosely mounted pinion to said driven shaft; a pinion keyed on said driven shaft adjacent said second constant transmission pair of pinions; a pinion meshing with said driven-shaft pinion, loosely mounted on said countershaft; a further pinion keyed on said driven shaft adjacent said other pinion on said shaft; a pinion constantly meshing with said further keyed pinion, loosely mounted on said countershaft; means for coupling each of said loosely mounted pinions, on said countershaft, to said shaft; a further pinion loosely mounted on said driven shaft; a further pinion keyed on said countershaft; a stub shaft in said casing adjacent said last-mentioned pair of pinions; an intermediate pinion rotatably mounted on said stub-shaft, said pinion meshing with each pinion of said last-mentioned pair of pinions to produce reverse drive and claw clutch mechanism mounted on said driven shaft for coupling said loosely mounted pinion of the reverse set to said driven shaft and said pairs of constantly meshing pinions being so relatively located in said casing and so dimensioned that, for obtaining high speed or overdrive, said second-mentioned pair of constant transmission pinions and said third-mentioned pair of pinions are employed, whilst, for obtaining the third speed ratio, said second-mentioned pinion on said driving shaft is coupled to said driven shaft to form the driven pinion for this speed and for obtaining the fourth speed ratio, said first-mentioned pinion of said driven shaft is employed as the driven pinion.

5. A vehicle change-speed gear of the kind referred to, comprising the subcombination of: a casing; a driving shaft rotatably mounted in said casing; a driven shaft rotatably mounted in said casing arranged coaxial with said driving shaft; a countershaft rotatably mounted in said casing, said shaft being arranged parallel to said coaxial driving and driven shafts; a first pinion loosely mounted on said driving shaft; a pinion keyed on said countershaft and meshing with said first-mentioned pinion, said pinions together forming a constant transmission from said driving- to said countershaft; a second pinion loosely mounted on said driving shaft adjacent to said first-mentioned pinion; a second pinion keyed on said countershaft and meshing with said second loosely mounted pinion, said second pair of pinions also forming a constant transmission from said driving- to said countershaft; an electromagnetic clutch associated with each of said loosely mounted pinions, said clutches being keyed on said driving shaft, operable to couple said pinions to said driving shaft; an electromagnetic clutch keyed on said driven shaft, said clutch also being associated with said second-mentioned loosely mounted pinion for coupling said pinion to said driven shaft; a pinion keyed on said driven shaft adjacent said second constant transmission pair of pinions; a pinion meshing with said driven-shaft pinion, loosely mounted on said countershaft; a further pinion keyed on said driven shaft adjacent said other pinion on said shaft; a pinion constantly meshing with said further keyed pinion, loosely mounted on said countershaft; and means for coupling each of said loosely mounted pinions, on said countershaft, to said shaft; a further pinion loosely mounted on said driven shaft; a further pinion keyed on said countershaft; a stub shaft in said casing adjacent said last-mentioned pairs of pinions; an intermediate pinion rotatably mounted on said stub-shaft, said pinion meshing with each pinion of said last-mentioned pair of pinions to produce reverse drive and claw clutch mechanism mounted on said driven shaft for coupling said loosely mounted pinion of the reverse set to said driven shaft and friction means for bringing the speed of rotation of said loosely mounted pinion up to that of the driven shaft before said pinion is completely coupled thereto and said pairs of constantly meshing pinions being so relatively located in said casing and so dimensioned that, for obtaining high speed or overdrive, said second-mentioned pair of constant transmission pinions and said third-mentioned pair of pinions are employed, whilst, for obtaining the third speed ratio, said second-mentioned pinion on said driving shaft is coupled to said driven shaft to form the driven pinion for this speed and for obtaining the fourth speed ratio, said first-mentioned pinion of said driven shaft is employed as the driven pinion.

6. A vehicle change-speed gear of the kind referred to comprising the subcombination of: a casing; a driving shaft rotatably mounted in said casing; a driven shaft rotatably mounted in said casing arranged coaxial with said driving shaft; a countershaft rotatably mounted in said casing, said shaft being arranged parallel to said coaxial driving and driven shafts; a first pinion loosely mounted on said driving shaft; a pinion keyed on said countershaft and meshing with said first-mentioned pinion, said pinions together forming a constant transmission from said driving- to said countershaft; a second pinion loosely mounted on said driving shaft adjacent to said first-mentioned pinion; a second pinion keyed on said countershaft and meshing with said second loosely mounted pinion, said second pair of pinions also forming a constant transmission from said driving- to said countershaft; an electromagnetic clutch associated with each of said loosely mounted pinions, said clutches being keyed on said driving shaft, operable to couple said pinions to said driving shaft; an electromagnetic clutch keyed on said driven shaft, said clutch also being associated with said second-mentioned loosely mounted pinion for coupling said pinion to said driven shaft; a pinion keyed on said driven shaft adjacent said second constant transmission pair of pinions; a pinion meshing with said driven-shaft pinion, loosely mounted on said countershaft; a further pinion keyed on said driven shaft adjacent said other pinion on said shaft; a pinion constantly meshing with said further keyed pinion, loosely mounted on said countershaft; and means for coupling each of said loosely mounted pinions, on said countershaft, to said shaft; a further pinion loosely mounted on said driven shaft; a further pinion keyed on said countershaft; a stub-shaft in said casing adjacent said last-mentioned pair of pinions; an intermediate pinion rotatably mounted on said stub-shaft, said pinion meshing with each pinion of said last-mentioned pair of pinions to produce reverse drive; claw clutch mechanism mounted on said driven shaft for coupling said loosely mounted pinion of the reverse set to said driven shaft; means for actuating said claw-clutch mechanism; additional means on said driving shaft, independent of said first-mentioned electromagnetic clutch, for automatically coupling the driving pinion of said first-mentioned constant transmission pairs of pinions to said driving shaft when said claw clutch is actuated, and said pairs of constantly meshing pinions being so relatively located in said casing and so dimensioned that, for obtaining high speed or overdrive, said second-mentioned pair of constant transmission pinions and said third-mentioned pair of pinions are employed, whilst, for obtaining the third speed ratio, said second-mentioned pinion on said driving shaft is coupled to said driven shaft to form the driven pinion for this speed and for obtaining the fourth speed ratio, said first-mentioned pinion of said driven shaft is employed as the driven pinion.

7. A vehicle change-speed gear of the kind referred to, comprising the subcombination of a casing; a driving shaft rotatably mounted in said casing; a driven shaft rotatably mounted in said casing arranged coaxial with said driving shaft; a countershaft rotatably mounted in said casing, said shaft being arranged parallel to said coaxial driving and driven shafts; a first pinion loosely mounted on said driving shaft; a pinion keyed on said countershaft and meshing with said first-mentioned pinion, said pinions together forming a constant transmission from said driving- to said countershaft; a second pinion loosely mounted on said driving shaft adjacent to said first-mentioned pinion; a second pinion keyed on said countershaft and meshing with said second loosely mounted pinion, said second pair of pinions also forming a constant transmission from said driving- to said countershaft; an electromagnetic clutch associated with each of said loosely mounted pinions, said clutches being keyed on said driving shaft, operable to couple said pinions to said driving shaft; an electromagnetic clutch keyed on said driven shaft, said clutch also being associated with said second-mentioned loosely mounted pinion for coupling said pinion to said driven shaft; a pinion keyed on said driven shaft adjacent said second constant transmission pair of pinions; a pinion meshing with said driven-shaft pinion, loosely mounted on said countershaft; a further pinion keyed on said driven shaft adjacent said other pinion on said shaft; a pinion constantly meshing with said further keyed pinion, loosely mounted on said countershaft; means for coupling each of said loosely mounted pinions, on said countershaft, to said shaft; a further pinion loosely mounted on said driven shaft; a further pinion keyed on said countershaft; a stub-shaft in said casing adjacent the last-mentioned pair of pinions; an intermediate pinion rotatably mounted on said stub-shaft, said pinion meshing with each pinion of said last-mentioned pair of pinions to produce reverse drive and claw clutch mechanism mounted on said driven shaft for coupling said loosely mounted pinion of the reverse set to said driven shaft; a mechanical clutch device on said driving shaft for coupling the driving pinion of said first-mentioned constant transmission pair of pinions to said driving shaft independently of said first-mentioned electromagnetic clutch and common actuating means associated with said reverse gear claw-clutch device and said mechanical clutch for automatically actuating said two clutches simultaneously for the purpose specified and said pairs of constantly meshing pinions being so relatively located in said casing and so dimensioned that, for obtaining high speed or overdrive, said second-mentioned pair of constant transmission pinions and said third-mentioned pair of pinions are employed, whilst, for obtaining the third speed ratio, said second-mentioned pinion on said driving shaft is coupled to said driven shaft to form the driven pinion for this speed and for obtaining the fourth speed ratio, said first-mentioned pinion of said driven shaft is employed as the driven pinion.

8. A vehicle change-speed gear of the kind referred to comprising the subcombination of: a casing; a driving shaft rotatably mounted in said casing; a driven shaft rotatably mounted in said casing arranged coaxial with said driving shaft; a mechanical clutch device between said driving and said driven shafts for directly coupling said two shafts in driving relation; means for actuating said clutch device; a counter-shaft rotatably mounted in said casing, said shaft being arranged parallel to said coaxial driving and driven shafts; a first pinion loosely mounted on said driving shaft; a pinion keyed on said countershaft and meshing with said first-mentioned pinion, said pinions together forming a constant transmission from said driving- to said countershaft; a second pinion loosely mounted on said driving shaft adjacent to said first-mentioned pinion; a second pinion keyed on said countershaft and meshing with said second loosely mounted pinion, said second pair of pinions also forming a constant transmission from said driving- to said countershaft; means for coupling each of said loosely mounted pinions, on said driving shaft, to said shaft; means for coupling said second-mentioned loosely mounted pinion on said driving shaft to said driven shaft; a pinion keyed on said driven shaft adjacent said second constant transmission pair of pinions; a pinion meshing with said driven shaft pinion, loosely mounted on said countershaft; a further pinion keyed on said driven shaft adjacent said other pinion on said shaft; a pinion constantly meshing with said further keyed pinion, loosely mounted on said countershaft; and means for coupling each of said loosely mounted pinions, on said countershaft, to said shaft, and said pairs of constantly meshing pinions being so relatively located in said casing and so dimensioned that, for obtaining high speed or overdrive, said second-mentioned pair of constant transmission pinions and said third-mentioned pair of pinions are employed, whilst, for obtaining the third speed ratio, said second-mentioned pinion on said driving shaft is coupled to said driven shaft to form the driven pinion for this speed and for obtaining the fourth speed ratio, said first-mentioned pinion of said driven shaft is employed as the driven pinion.

9. A vehicle change-speed gear of the kind referred to comprising the subcombination of: a casing; a driving shaft rotatably mounted in said casing; an extension on said shaft; a driven shaft rotatably mounted in said casing in axial alignment with said driving shaft, said driven shaft having a hollowed portion into which said driving shaft extension protrudes; a mechanical clutch device between said driving and said driven shafts for directly coupling said shafts in driving relation, said device comprising a control sleeve slidably arranged on said hollowed portion of said driven shaft and housing therein a plurality of balls adapted, on movement of said sleeve in clutch-engaging direction, to enter peripheral recesses formed in said driving shaft extension; means for actuating said clutch device; a countershaft rotatably mounted in said casing, said shaft being arranged parallel to said coaxial driving and driven shafts; a first pinion loosely mounted on said driving shaft; a pinion keyed on said countershaft and meshing with said first-mentioned pinion, said pinions together forming a constant transmission from said driving- to said countershaft; a second pinion loosely mounted on said driving shaft adjacent to said first-mentioned pinion; a second pinion keyed on said countershaft and meshing with said second loosely mounted pinion, said second pair of pinions also forming a constant transmission from said driving- to said countershaft; means for coupling each of said loosely mounted pinions, on said driving shaft, to said shaft; means for coupling said second-mentioned loosely mounted pinion on said driving shaft to said driven shaft; a pinion keyed on said driven shaft adjacent said second constant transmission pair of pinions; a pinion meshing with said driven shaft pinion, loosely mounted on said countershaft; a further pinion keyed on said driven shaft adjacent said other pinion on said shaft; a pinion constantly meshing with said further keyed pinion, loosely mounted on said countershaft; and means for coupling each of said loosely mounted pinions, on said countershaft, to said shaft, said pairs of constantly meshing pinions being so relatively located in said casing and so dimensioned that, for obtaining high speed or overdrive, said second-mentioned pair of constant transmission pinions and said third-mentioned pair of pinions are employed, whilst, for obtaining the third speed ratio, said second-mentioned pinion on said driving shaft is coupled to said driven shaft to form the driven pinion for this speed and for obtaining the fourth speed ratio, said first-mentioned pinion of said driven shaft is employed as the driven pinion.

ALBERT MAIER.